United States Patent
Umeda et al.

(10) Patent No.: US 8,193,681 B2
(45) Date of Patent: Jun. 5, 2012

(54) LAMINATED STATOR CORE AND METHOD FOR MANUFACTURING THE SAME

(75) Inventors: Kazuhiko Umeda, Kitakyushu (JP);
Shuichi Nakamura, Kitakyushu (JP);
Kenichiro Iwata, Kitakyushu (JP)

(73) Assignee: Mitsui High-Tec, Inc., Kitakyushu-shi, Fukuoka (JP)

( * ) Notice: Subject to any disclaimer, the term of this patent is extended or adjusted under 35 U.S.C. 154(b) by 360 days.

(21) Appl. No.: 12/667,811

(22) PCT Filed: Nov. 11, 2008

(86) PCT No.: PCT/JP2008/070510
§ 371 (c)(1),
(2), (4) Date: Jan. 5, 2010

(87) PCT Pub. No.: WO2009/069463
PCT Pub. Date: Jun. 4, 2009

(65) Prior Publication Data
US 2010/0327690 A1    Dec. 30, 2010

(30) Foreign Application Priority Data
Nov. 26, 2007    (JP) ................................ 2007-304743

(51) Int. Cl.
*H02K 1/06*    (2006.01)
(52) U.S. Cl. ............. 310/216.011; 310/216.004; 29/596
(58) Field of Classification Search ........... 310/216.011, 310/216.004, 216.012, 216.15, 216.016
See application file for complete search history.

(56) References Cited

U.S. PATENT DOCUMENTS

| | | | |
|---|---|---|---|
| 4,616,151 A * | 10/1986 | Pryjmak | 310/216.012 |
| 4,642,502 A * | 2/1987 | Carpenter et al. | 310/156.12 |
| 5,331,238 A * | 7/1994 | Johnsen | 310/58 |
| 5,629,572 A * | 5/1997 | Satomi et al. | 310/49.43 |
| 6,938,322 B2 * | 9/2005 | Luttrell | 29/596 |
| 7,002,277 B2 * | 2/2006 | Yamamoto et al. | 310/216.001 |
| 7,298,064 B2 * | 11/2007 | Yamamoto et al. | 310/216.057 |

(Continued)

FOREIGN PATENT DOCUMENTS

JP    50-146805 A    11/1975

(Continued)

OTHER PUBLICATIONS

Japanese Office Action issued in corresponding Japanese Application No. 2009-506843, mailing date of May 26, 2009.

(Continued)

*Primary Examiner* — Thanh Lam
(74) *Attorney, Agent, or Firm* — Westerman, Hattori, Daniels & Adrian, LLP (57) ABSTRACT

A laminated stator core 10 and a manufacturing method thereof, the method including producing a plurality of core sheets 15 and 16 from a strip 33, ends 34 of the strip 33 being a part of a product without being cut twice, and rotating and laminating the core sheets. A laminated stator core formed by core sheets blanked from a magnetic strip, both ends of the magnetic strip being one of the sides of the core sheets, wherein the identically shaped core sheets each have a rotor space in the center thereof, each rotor space having a center located off-center in one direction with respect to each center of the core sheets, and the core sheets are rotated by a predetermined angle before being laminated with the rotor spaces vertically aligned.

9 Claims, 7 Drawing Sheets

U.S. PATENT DOCUMENTS

| | | | |
|---|---|---|---|
| 7,352,101 B2 * | 4/2008 | Fujita | 310/216.011 |
| 2004/0056556 A1 * | 3/2004 | Fujita | 310/217 |
| 2005/0023925 A1 * | 2/2005 | Yamamoto et al. | 310/216 |
| 2005/0229384 A1 * | 10/2005 | Yamamoto et al. | 29/598 |
| 2006/0163967 A1 * | 7/2006 | Yamamoto et al. | 310/216 |
| 2008/0036311 A1 * | 2/2008 | Yamamoto et al. | 310/42 |

FOREIGN PATENT DOCUMENTS

| | | |
|---|---|---|
| JP | 53-145101 U | 4/1977 |
| JP | 54-082602 A | 7/1979 |
| JP | 60-121943 A | 6/1985 |
| JP | 61-32753 U | 2/1986 |
| JP | 62-012341 A | 1/1987 |
| JP | 62-114449 A | 5/1987 |
| JP | 5-003648 A | 1/1993 |
| JP | 08-331780 A | 12/1996 |
| JP | 2001-103691 A | 4/2001 |

OTHER PUBLICATIONS

Japanese Final Office Action issued in corresponding Japanese Application No. 2009-506843, mailing date of Sep. 26, 2009.
International Search Report of PCT/JP2008/070510, mailing date of Feb. 17, 2009.

* cited by examiner

LAMINATED STATOR CORE AND METHOD FOR MANUFACTURING THE SAME

TECHNICAL FIELD

The present invention relates to a laminated stator core and a method for manufacturing the same, capable of improving material yields and compensating variations in the thickness of a material strip.

BACKGROUND ART

To produce a laminated core, generally, core sheets having an identical shape are blanked from a material strip and interlocked with one another inside dies. In the blanking process, to compensate thickness deviations of the core sheets, the core sheets are rotated prior to being laminated. Also, outlines of the laminated core need to have rotational symmetries regardless of a rotational angle of the core sheets. As for a blank layout, full blanking (blanking a whole outline at a time) is generally used. However, the full blanking generates a lot of material scraps, resulting in poor yields of the material. Patent Documents 1 and 2 employ a scrapless blanking as the blank layout to improve material yields and a multiline alignment of the core sheets to enable effective use of the strip.

[Patent Document 1] Japanese Unexamined Patent Application Publication No. 62-114449

[Patent Document 2] Japanese Unexamined Patent Application Publication No. 60-121943

DISCLOSURE OF INVENTION

Problems to be Solved by the Invention

The scrapless blanking in the Patent Document 1 or 2, however, is unable to punch out the core sheets along the outlines thereof within a required accuracy because the material strips have variation in width and lateral ends of the strips are partly used as the outlines of the core sheets. Furthermore, the scrapless blanking generates burrs due to double cuttings, resulting in dents on the core sheets or frictional wear of cutting tools. Thus, in the blanking process, to prevent the cutting tools from contacting the outlines of the core sheets that have been punched out in the previous processes, each die needs to have an allowance and round corners especially when the material strip has some irregularities in feeding intervals or width tolerances.

When the core sheets blanked in the scrapless manner are to be rotated by a predetermined angle before being laminated, the above-mentioned allowance and round corners have to be part of the cutting edge of the die. However, it is difficult to form such allowance and round corners in each die, and the absence of the allowance and round corners increases a risk of the double cuttings. Therefore, the core sheets formed by the scrapless blanking are not rotated are not rotated before being laminated at present, and the laminated stator core formed with the scrapless blanked core sheets has a tilt due to the thickness deviation of the sheets.

The present invention has been made in view of the above circumstances and has an object to provide a laminated stator core and a method for manufacturing the same. In the laminated stator core, ends of a material strip (band-shaped plate) forming a plurality of core sheets are used as part of a product without being cut off twice, and the core sheets are rotated by a predetermined angle prior to being laminated.

Means for Solving the Problems

To accomplish the above object, a first aspect of the present invention provides a laminated stator core using a side of a magnetic strip as a side of a core sheet, wherein a plurality of the core sheets have an identical shape, each of the core sheets having a rotor space in an inner part (e.g., vertical and lateral center) thereof, the rotor space having a center arranged eccentrically in one direction to a center of the core sheet, and the core sheets are rotated by a predetermined angle and laminated in a manner that the centers of the rotor spaces are vertically aligned.

A second aspect of the present invention provides a laminated stator core according to the first and second aspects, wherein every core sheet or every set of the plural core sheets is rotated by the predetermined angle and laminated. Generally, the core sheets are rotated by 180 degrees, however, the core sheets may be rotated by 360/n degrees ("n" is an integer) depending on shapes of the core sheets.

A third aspect of the present invention provides a laminated stator core according to the first aspect, wherein each of the core sheets has locating portions at the same distance from the center of the rotor space. If the core sheet has a rectangular shape, the locating portions are preferably formed at the corners of the core sheet.

To accomplish the above object, a fourth aspect of the present invention provides a method for manufacturing a laminated stator core using a lateral side of a magnetic strip as a side of a core sheet, the core having a rotor space in an inner part thereof, the method comprising the steps of:

blanking the core sheet with a cutting tool having a punch and a die and pressing the core sheet into the die, the punch and the die being larger than the core sheet in vertical and lateral dimensions, a side/sides of the cutting tool set along a borderline/borderlines between the core sheet and the adjoining core sheet/sheets, the borderline/borderlines being one vertical side and/or one lateral side of the core sheet; and rotating the core sheet by a predetermined angle and laminating the core sheet inside the die.

A fifth aspect of the present invention provides a method for manufacturing a laminated stator core according to the fourth aspect, wherein the core sheet has locating portions formed in a predetermined distance from the center of the rotor space, and the core sheet to be blanked is positioned with positioning walls formed inside the die.

A sixth aspect of the present invention provides a method for manufacturing a laminated stator core according to the fifth aspect, wherein the locating portions are formed at the corners of the core sheet having a rectangular shape. The locating portions are preferably formed at (two or four) diagonally opposite corners of each of the core sheets.

A seventh aspect of the present invention provides a method for manufacturing a laminated stator core using a lateral side of a magnetic strip as a side of a core sheet, the core sheet having a rectangular shape with a vertical width of "a" and a lateral width of "b," the core sheet having a round shaped rotor space in an inner part thereof, and the method comprising the steps of:

Step 1 of forming the rotor spaces, the rotor spaces adjacent in a feed direction of the strip having a distance of "b" between the centers thereof, the rotor spaces in the core sheets at the end in the width direction of the strip having the centers located $(a-\alpha)/2$ inward from the side edge of the core sheets;

Step 2 of punching out slots in the strip having the rotor spaces, the slots formed with respect to the center of the rotor space, thereby forming magnetic pole pieces in the inner part of the core sheet and locating portions at the corners of the core sheet axisymmetrically with respect to the center of the rotor space; and Step 3 of punching out the core sheet using a set of a punch and a die in a manner that axes of the punch and the die are aligned with the center of rotor space, each of the punch and the die having a vertical width of (a+β) and a lateral width of (b+γ); pressing the core sheet into the die; and laminating the core sheet inside the die with a position thereof adjusted using positioning walls fitting to the locating portions of the core sheet;

wherein the die rotates every core sheet or every set of the plural core sheets by a predetermined angle prior to the lamination of the core sheets.

Here, values of α, β, and γ finalize dimensions of projections and recesses formed along the sides of the laminated stator core.

An eighth aspect of the present invention provides a method for manufacturing a laminated stator core according to the seventh aspect, wherein the strip has three or more lines of the core sheets, the core sheets aligned in the width direction of the strip are lined up in the same manner to the feed direction of the strip, and each of the core sheets in an inner line between the core sheets at the both ends of the strip has the center of the rotor space arranged eccentrically in one direction to the lateral sides of the core sheet.

A ninth aspect of the present invention provides a method for manufacturing a laminated stator core according to the eighth aspect, wherein the core sheets in the inner line are punched out after the core sheets at the both ends are punched out.

A tenth aspect of the present invention provides a method for manufacturing a laminated stator core according to the ninth aspect, wherein the core sheets are lined up in a plurality of inner lines and aligned in the same manner to the feed direction of the strip, and the core sheets are punched out sequentially.

An eleventh aspect of the present invention provides a method for manufacturing a laminated stator core according to the eighth to the tenth aspects, wherein the core sheets in the inner line/lines are punched out, rotated, and laminated in the same way as the core sheets at the both ends.

A twelfth aspect of the present invention provides a laminated stator core manufactured by the method according to the fourth to the eleventh aspects, the core comprising projections and recesses along the sides thereof, each of the projections and recesses formed with one core sheet or a set of plural core sheets.

Effect of the Invention

The laminated stator core and manufacturing method thereof according to the present invention can simplify pressing processes and improve material yields, since both sides of the strip are used as one of the sides of the core sheets.

The core sheets (including the rectangular shaped core sheets) to be laminated are identical in shape, thereby lowering the cost of the die device and simplifying the manufacturing procedures.

The core sheets are rotated by a predetermined angle and laminated with the rotor spaces thereof vertically aligned, and then interlocked with one another. Therefore, the laminated stator core having a uniform height can be produced and projections and recesses can be formed along the side surfaces of the core, thereby increasing the surface areas of the core and improving a cooling ability of the core.

In the present method, since each of the punch and the die is larger than the core sheet in size, the ends of the core sheet will not be cut twice.

DESCRIPTION OF NUMERALS

10: laminated stator core, 11: yoke section, 12, 13: pole section, 14: rotor space, 15, 16: core sheet, 17: caulking portion, 18: top side, 19: bottom side, 20: center, 21: left-hand side, 22: right-hand side, 23: top side, 24: bottom side, 25: left-hand side, 26: right-hand side, 28: projections and recesses, 31: locating portion, 33: strip, 34: end, 35, 36: pilot hole, 37, 38: pole piece, 39-41: slot, 42: yoke piece, 43, 44: borderline, 43a: pilot pin, 50: laminated stator core, 51, 52: core sheet, 53: pole piece, 55: rotor space, 56, 57: projections and recesses, 58: strip, 59: locating portion

BEST MODE FOR CARRYING OUT THE INVENTION

Figure 1:
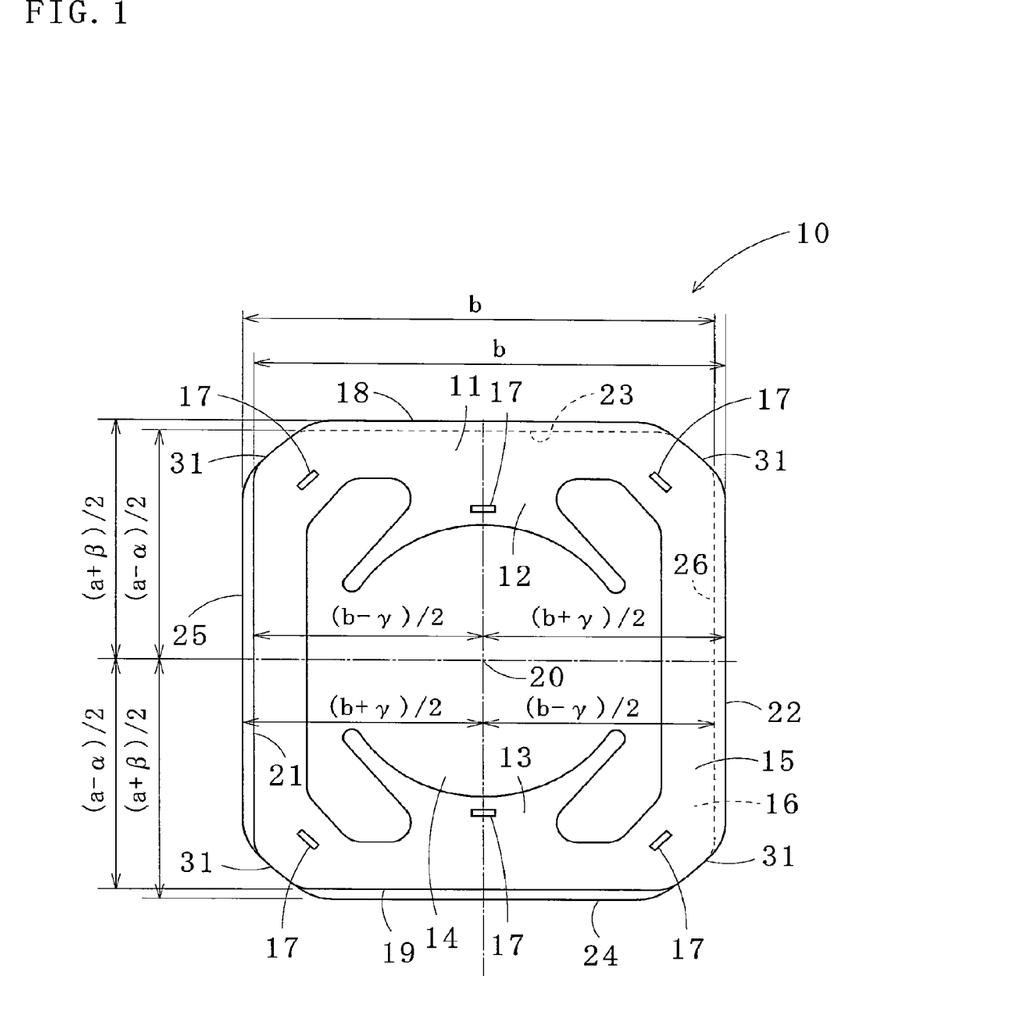
FIG. 1 is a plan view of a laminated stator core according to one embodiment of the present invention.
Figure 2:
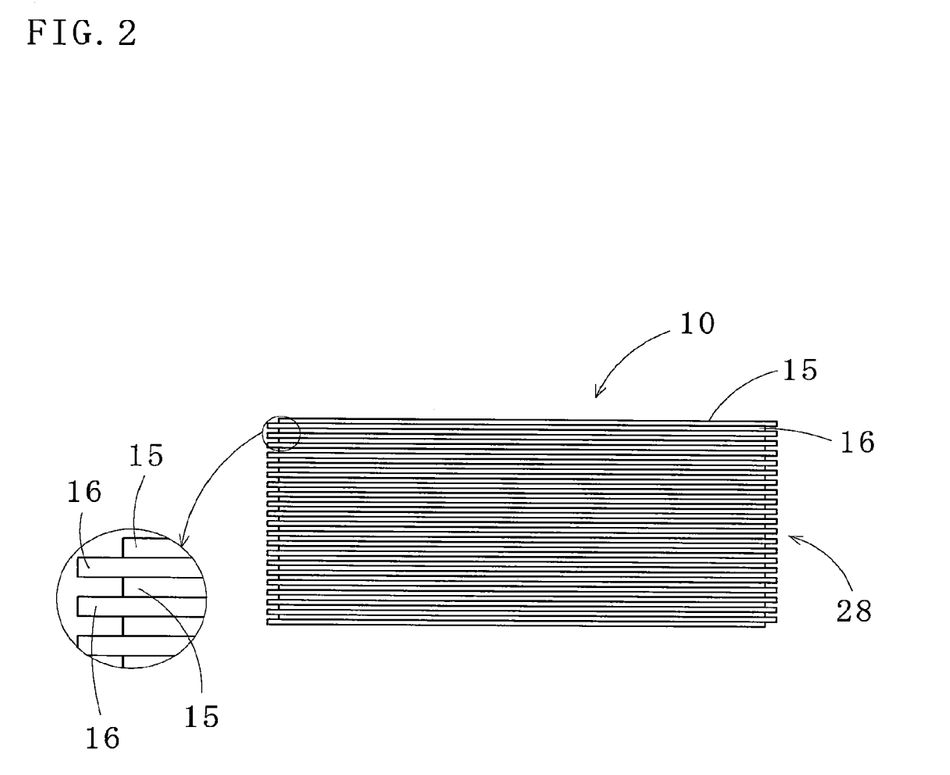
FIG. 2 is an elevational view of the laminated stator core.
Figure 3:
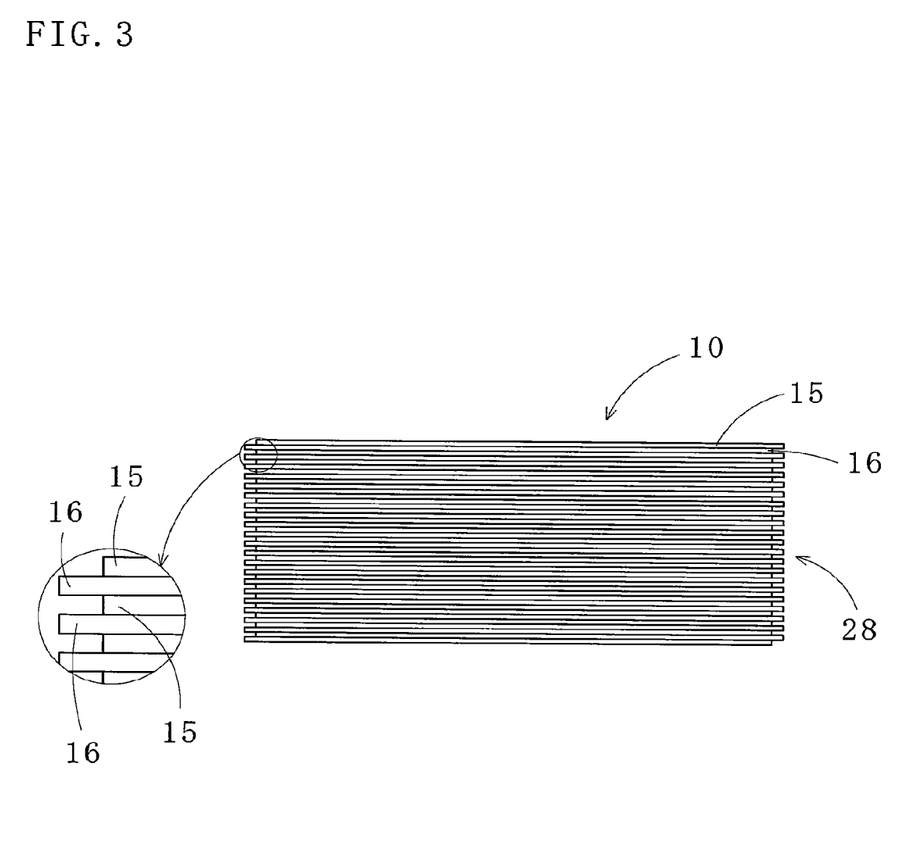
FIG. 3 is a right side elevational view of the laminated stator core.

Referring to FIGS. 1 to 3, a laminated stator core 10 according to one embodiment of the present invention is described.

The laminated stator core 10 according to one embodiment of the present invention comprises: a yoke section 11; pole sections 12 and 13 formed inside the yoke section 11; and a rotor space 14 formed between the pole sections 12 and 13. An outline of the yoke section 11 is substantially rectangular shaped when viewed from the top. The rotor space 14 is circular shaped when viewed from the top. The laminated stator core 10 is rectangular shaped when viewed from the top and four corners thereof are rounded off. To form the laminated stator core 10, a plurality of core sheets 15 and 16 having a rectangular shape are sequentially and alternately laminated, and then caulked (interlocked) through caulking portions 17. In addition, a center 20 of the rotor space 14 is arranged vertically and laterally off-center from each center of the core sheets 15 and 16.

In FIG. 1, as for the core sheet 15 having a vertical width of $(a+\beta/2-\alpha/2)$ and a lateral width of "b," a distance from the center 20 of the rotor space 14 to a top side 18 is $(a+\beta)/2$, to a bottom side 19 is $(a-\alpha)/2$, to a left-hand side 21 is $(b-\gamma)/2$, and to a right-hand side 22 is $(b+\gamma)/2$. In this embodiment, α, β, and γ are set within the following ranges: $0<\alpha<0.05a$; $0<\beta<0.05a$; and $0<\gamma<0.05b$. It is preferable that α and β are set to be equal or substantially equal. The values of α, β, and γ are set to less than 0.05a or 0.05b since α, β, and γ greater than 0.05a or 0.05b result in too wide differences between projections and recesses formed along the side surfaces of the laminated stator core 10, which decreases the efficiency in the use of the core sheets.

As for the core sheet 16, a distance from the center 20 of the rotor space 14 to a top side 23 is $(a-\alpha)/2$, to a bottom side 24 is $(a+\beta)/2$, to a left-hand side 25 is $(b+\gamma)/2$, and to a right-hand side 26 is $(b-\gamma)/2$. In short, the core sheets 15 and 16 are congruent. However, the core sheets 15 and 16 are laminated after being rotated (by 180 degrees in this embodiment) around the center 20 of the rotor space 14. This method enables projections and recesses 28 to be formed on the side surfaces of the laminated stator core 10, which is rectangular shaped when viewed from the top and formed by the identically shaped core sheets 15 and 16, thereby improving a cooling ability of the core 10.

The projecting length of projections and recesses 28 is determined by the values of $\alpha$, $\beta$, and $\gamma$. In general, the length is preferably set to 0.5 to 4 times the thickness of each core sheet. In the laminated stator core 10, both ends 34 of a magnetic strip 33 (see FIG. 4) are used as the bottom side 19 of the core sheet 15 and the top side 23 of the core sheet 16. In addition, circular-arc shaped locating portions 31 are provided at the four corners of the core sheets 15, 16 and axisymmetrically located at the same distance (i.e. the same radius) from the center 20 of the rotor space 14. Also, the locating portions 31 serve to round off the four corners of the core sheets 15 and 16.

Figure 4:
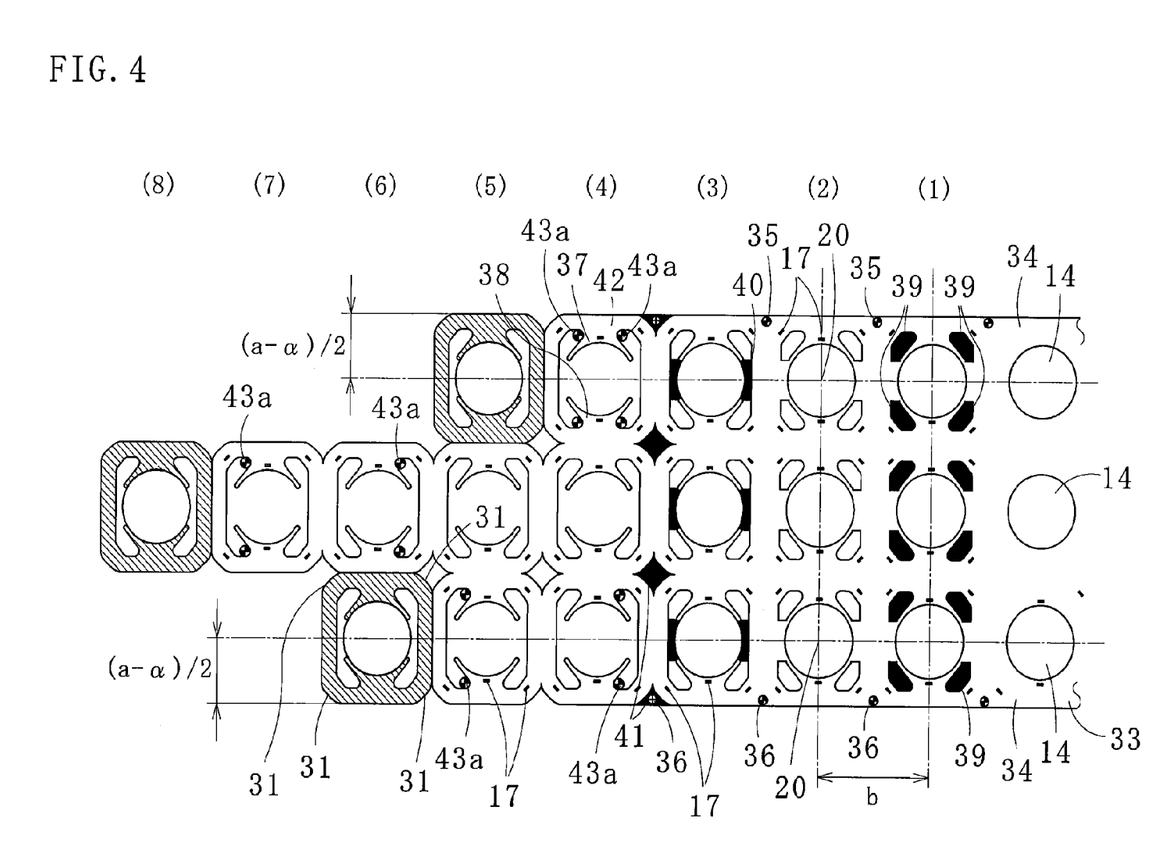
FIG. 4 illustrates a method for manufacturing the laminated stator core.
Figure 5:
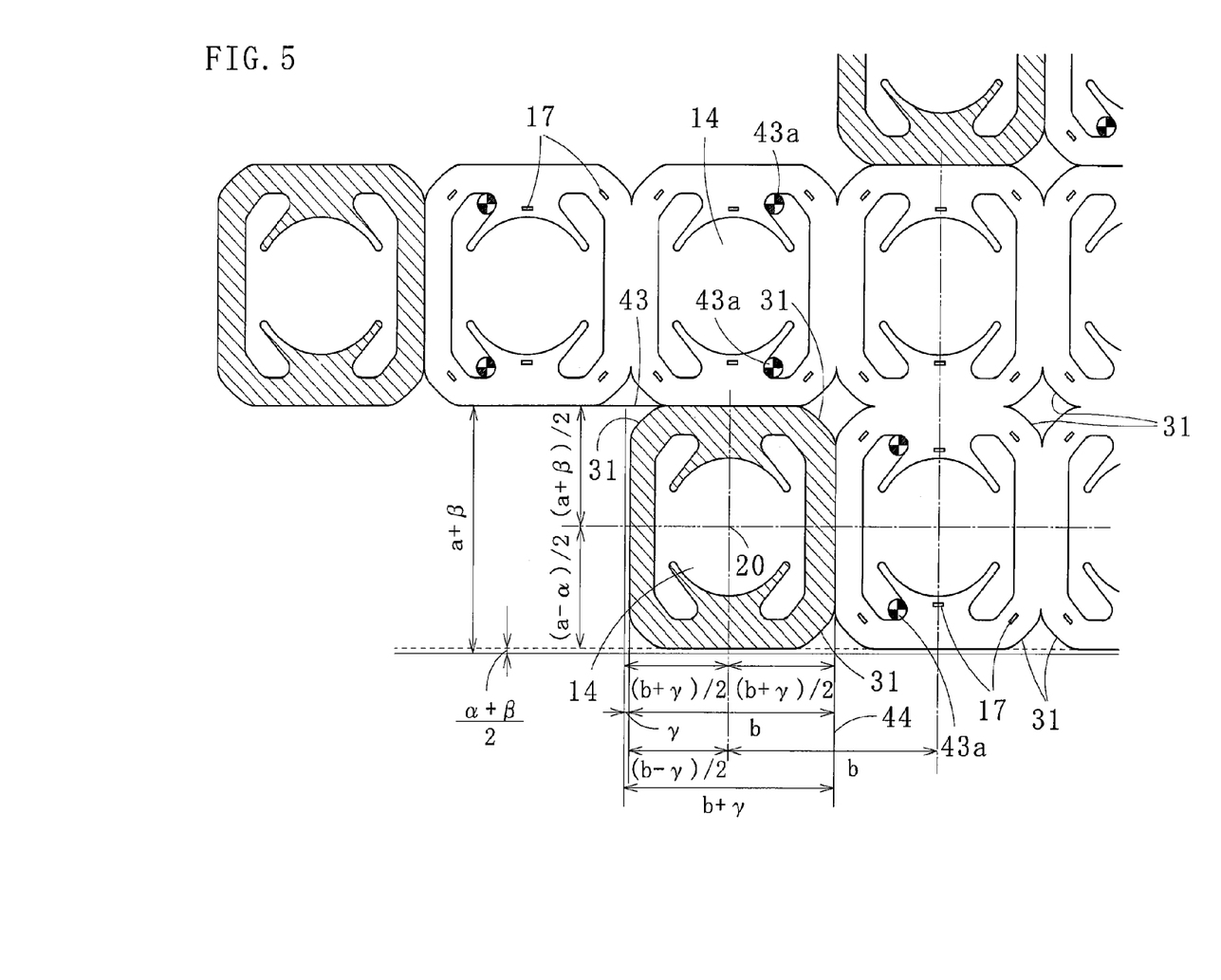
FIG. 5 illustrates the details of the method.

Referring to FIGS. 4 and 5, a method for manufacturing the laminated stator core according to one embodiment of the present invention is described.

In the method, the magnetic strip 33 is used that has an enough width to allocate three pieces of the core sheets 15 and 16 in the width direction of the strip 33. The both ends (also called sides or side faces) 34 of the strip 33, in unchanged form, are used as one of the sides of the core sheets 15 and 16, and thus the width of the strip 33 is selected to be 3a or slightly smaller than 3a. In this embodiment, one piece of the strip 33 yields the core sheets 15 and 16 to be lined up uniformly to the feed direction of the strip and aligned in three lines in the width direction of the strip 33.

Also in this embodiment, a rotor (rotator) and a stator are blanked from the same material strip, so that the blanking of the rotor should be completed before that of the stator.

In the manufacture of the laminated stator core, pilot holes 35 and 36 are used that are preliminarily formed in the both ends of the strip 33 at the interval of "b" in the feed direction of the strip 33. The parts having the pilot holes 35 and 36 are located outside the locating portions 31 of the core sheets 15 and 16, and the parts are blanked eventually. A die device (a set of a punch and a die) is set such that the center 20 of the rotor space 14 is positioned: $\gamma/2$ forward from the middle point between adjacent pilot holes 35 or 36 in the feed direction of the strip 33; and $(a-\alpha)/2$ inward from the end of the strip 33. In this case, a borderline 43 (see FIG. 5) divides the core sheets 15 and 16 in the end 34 and those in the middle line, and a distance between the borderline 43 and the center of the rotor space 14 of the core sheet 15 or 16 in the end is $(a+\beta)/2$. In addition, a distance between the centers of the rotor spaces 14 is "b" in the feed direction of the strip 33.

In order that the laminated stator core 10 with the core sheets 15 and 16 in the middle line of the strip 33 may be substantially the same as the one with the core sheets 15 and 16 in the ends of the strip 33, the center 20 of the rotor space 14 of the core sheet 15 or 16 in the middle line should be located $(a-\alpha)/2$ inward from the borderline 43 in the width direction of the strip 33. The three pieces of the core sheets 15 and 16 are aligned in the width direction of the strip 33, and each of the core sheets 15 and 16 has the lateral width of "b" and the vertical width of "a" if a is equal to $\beta$. Since $\alpha$ is larger than $\beta$ normally, each of the core sheets 15 and 16 in both ends in the width direction of the strip 33 has the vertical length that is shorter than "a" by $(\alpha-\beta)/2$. The values of $\alpha$, $\beta$, and $\gamma$ determine the formation of the projections and recesses 28 (the height of the projections) on a finished product, that is the laminated stator core 10. As previously mentioned, generally, it is preferable to set $\alpha$, $\beta$, and $\gamma$ within the following ranges: $0<\alpha<0.05a$; $0<\beta<0.05a$; and $0<\gamma<0.05b$. When the width of the strip 33 is exactly 3a, $\alpha$ is equal to $\beta$ as previously mentioned. It is, however, difficult to make the width of the strip 33 be exactly 3a. Therefore, in consideration of possible minimal errors, the dimensions mentioned above are described in different signs, $\alpha$ and $\beta$ (still, $\alpha \approx \beta$).

After the rotor spaces 14 are blanked in predetermined positions, the strip 33 is fed through a first to an eighth stations (processes) to produce the core sheets 15 and 16. In the processes, the core sheets 15 and 16 are attached to each other and aligned in the feed direction of the strip 33, and then the core sheets 15 and 16 are blanked and pressed into the die. A rotor core sheet may be produced from the blanked piece of the rotor space 14.

In the first station, slots 39 are punched out, thereby forming a part of pole pieces 37 and 38 inside the core sheets 15 and 16. Also, a caulking hole (rectangular through hole) as one example of a caulking portion 17 (V-shaped caulking in this embodiment) is formed in the core sheet 16 being the lowest core sheet. In this process, the punch does not work for the core sheets 15 and 16 except the lowest core sheet 16, in short, the caulking hole is formed only in the lowest core sheet 16.

In the second station, the caulking portions 17 of the well-known V-shaped caulking are formed in the core sheets 15 and 16 except in the lowest core sheet 16. In the third station, slots 40 are punched out, thereby forming the remaining bits of the pole pieces 37 and 38. This process determines the shapes of the pole pieces 37 and 38 formed inside yoke pieces 42. Also in the third station, slots 41 are punched out, thereby forming the locating portions 31 at the four corners of the core sheets 15 and 16.

In accordance with the blanking of the slots 41, the pilot holes 35 and 36 are blanked. In the fourth station, circular arcs, which are formed along the joining sections between the yoke pieces 42 and the pole pieces 37 and 38, are used as new pilot holes. Pilot pins 43a, as shown in the fourth and subsequent stations of FIG. 4, determine the position of the strip 33 under processing.

Although the fourth station is an idle station, the slots 41 may be blanked in this station. In the fifth station, the core sheets 15 and 16 lined up in the top end, as shown in FIG. 4, are punched out. In the sixth station, the core sheets 15 and 16 lined up in the bottom end, as shown in FIG. 4, are punched out. Since both of the fifth and sixth stations have the same procedure for blanking the core sheets 15 and 16 and laminating them inside the die, only the sixth station is described in details.

FIG. 5 illustrates the sixth station and the details of the core sheets 15 and 16 in the bottom end of the strip. The explanation is now given regarding the blanking of the lowest core sheet 16. The core sheet 16 has the vertical width of "a" approximately ("$a+\beta/2-\alpha/2$" exactly) and the lateral width of "b." The core sheet 16 has the center 20 of the rotor space 14 located $(b+\gamma)/2$ to the proximal side from the borderline 44 and $(a+\beta)/2$ below from the borderline 43. The borderline 44 divides the core sheet 16 from the core sheet 15 located at the proximal side of the die device, whereas the borderline 43 divides the core sheet 16 from the core sheet 15 located in the middle line of the strip 33. The die device (a cutting tool with a die and a punch) is adjusted to have the vertical width of $(a+\beta)$ and the lateral width of $(b+\gamma)$. The cutting edge of the die device (one side of the cutting tool) is set along the borderlines 43 and 44, and then the core sheet 16 is blanked and pressed into the die.

By the previous blanking, the core sheet 16 is cut off along the borderlines 43 and 44, but a bottom side facing the borderline 43 and a left hand side facing the borderline 44 are not cut off, since the size of the die device is larger than that of the core sheet 16. Specifically, the distances from the center 20 of the rotor space 14 to the bottom side and to the left hand side are $(a-\alpha)/2$ and $(b-\gamma)/2$, respectively. Therefore, the die device does not cut off the same ends of the core sheet 16 twice. At the same time, the blanking of the four locating portions 31 is carried out, each of which has a circular arc shape and the same radius from the center 20 of the rotor space.

The blanked core sheet 16 is pressed into the blank die at the lower part of the die device, and then the core sheet 16 is rotated by 180 degrees. As mentioned above, the caulking portions 17 formed in the lowest core sheet 16 are caulking holes. In the sixth station, the core sheet 15 to be produced next is exactly the same as the core sheet 16 when the core sheet 15 belongs to the strip 33. Thus, the core sheet 15 is blanked in the same process as the core sheet 16, and the blanked core sheet 15 is laminated on the lowest core sheet 16 and interlocked with each other.

Provided at the four corners of the blank die are positioning walls, which correspond to the locating portions 31 provided at the four corners of the core sheets 15 and 16. With the positioning walls, the rotor spaces 14 and the pole pieces 37, 38 can be vertically aligned with one another.

Subsequently, the core sheets 15 and 16 are punched out by the same procedure mentioned above. For the core sheets 16, 180-degree rotations are performed before being laminated on the core sheets 15. In the end, the laminated stator core 10 shown in FIGS. 1 to 3 is produced.

The seventh station is an idle station. In the eighth station, the core sheets 15 and 16 in the middle line of the strip are punched out.

The core sheets 15 and 16 in the middle line of the strip, as same as those in both ends of the strip, have the centers of rotor spaces 14 arranged eccentrically to the outlines of the core sheets 15 and 16. Therefore, the core sheets 15 and 16 in the middle line of the strip are blanked, rotated by a predetermined angle, and laminated in the same procedures as for those in both ends of the strip to yield the laminate stator core 10. Formed by press works, the outlines of the core sheets 15 and 16 in the middle line of the strip are positioned accurately. Thus, little or no scraps or cut out pieces are generated even if the die device punches out the same outlines of the core sheets twice due to positioning errors. Under the above-mentioned conditions, given that α is equal to β, the positions of the die device and the rotor spaces 14 are determined.

The die device with a low accuracy blanks the same core sheets twice at the slightly different positions. As a countermeasure, the die device may be designed such that a cutting width of each punch and die is larger than the vertical width of the core sheet 15 or 16, and such that previously-cut top and bottom sides of the core sheet 15 or 16 are placed inside the cutting position of each punch and die. Now, the method for manufacturing the core sheets 15 and 16 aligned in the middle line of the strip 33 is applicable to the production of the core sheets 15 and 16 in one line from a strip having a width of "a."

Figure 6:
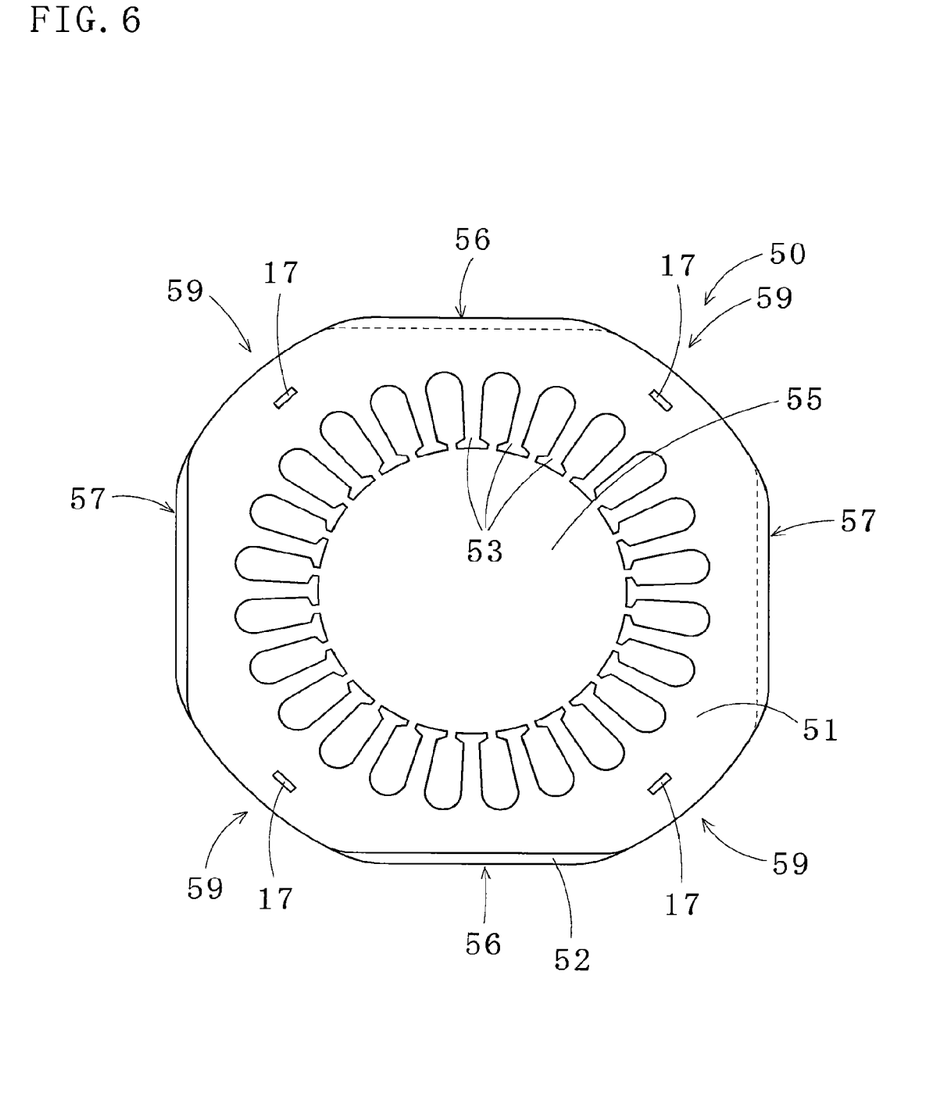
FIG. 6 is a plan view of a laminated stator core according to another embodiment of the present invention.
Figure 7:
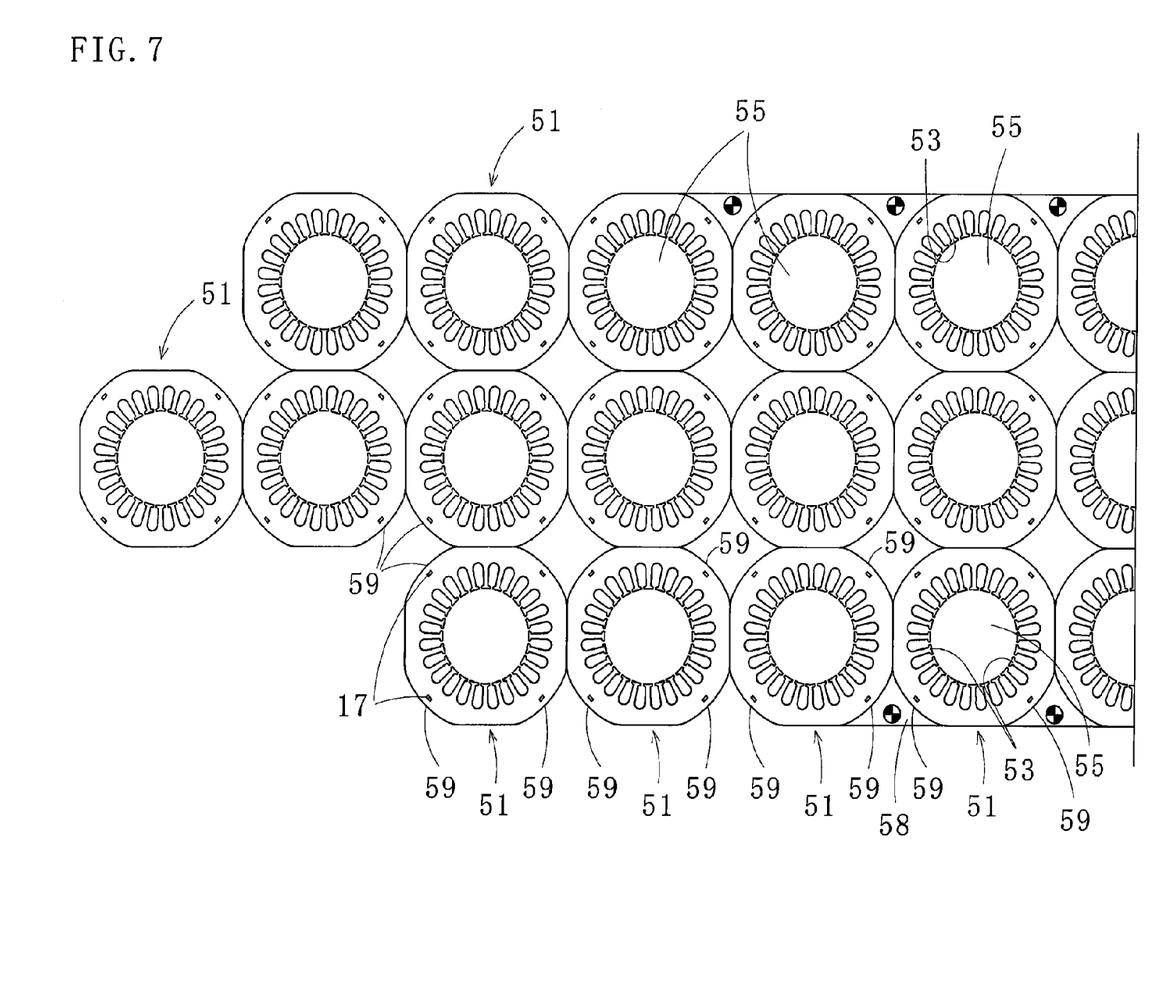
FIG. 7 illustrates a method for manufacturing the laminated stator core according to another embodiment of the present invention.

Referring to FIGS. 6 and 7, descriptions of manufacturing a laminated stator core 50 according to another embodiment of the present invention will be given. The laminated stator core 50 is formed with core sheets 51 and 52, and the core sheets 51 and 52 each have a plurality (multiplicity) of identically shaped pole pieces 53 inside thereof and a rotor space 55 within the pole pieces 53.

As well as the laminated stator core 10, the core sheets 51 have vertically and laterally parallel sides, and every other sheet 51 or every other set of the plural sheets 51 are to be the core sheet(s) 52 by 180-degree rotation and lamination, thereby forming projections and recesses 56 and 57 around the laminated stator core 50.

The laminated stator core 50 is manufactured in the same way as the above-mentioned laminated stator core 10. A strip 58 with rotor spaces blanked is supplied into the die device and slots for forming the pole pieces 53 are punched out. Then, locating portions 59 located around the core sheet are punched out, and finally the core sheet is cut off and pressed straight into a die using a punch. In these processes, the cutting edges of punches and dies are adjusted to be larger than open ends of the core sheet 51 to avoid cutting the outlines thereof twice. The locating portions 59 in a circular arc shape are formed at the four corners of the core sheet 51 with respect to the center of the rotor space 55. Provided at the four corners of the die, which houses the cut out core sheets 51 inside, are the sidewalls (positioning walls) for positioning the core sheets 51.

Every other core sheet 51 becomes the core sheet 52 by 180-degree rotation around the center of the rotor space 55 and lamination. In the end, the laminated stator core 50 shown in FIG. 6 is formed. In the laminated stator core 50, the core sheets 51 and the core sheets 52, which are the core sheets 51 rotated 180 degrees, have the pole pieces 53, the rotor spaces 55, and the caulking portions 17 vertically aligned.

The present invention is not limited to the above-stated embodiments. For example, the present invention may be applied to such a case that one or two lines, or four or more lines of the core sheets are produced from one strip, and the produced core sheets are rotated and laminated inside a blank die. When the core sheets are formed in four or more lines, the core sheets in adjacent lines are separately punched out in the different stations.

Also, every group of the core sheets may be rotated before being laminated one on another.

INDUSTRIAL APPLICABILITY

Since both ends of the strip are used as one of the sides of the core sheets, press works thereof are omitted and material yields are improved. The core sheets to be laminated are identical in shape, thereby lowering the cost of the die device and simplifying the manufacturing procedures. Therefore, the manufacturing cost of the laminated stator core is reduced.

The core sheets are rotated, laminated, and interlocked with one another with the rotor spaces thereof vertically aligned to produce the laminated stator core having a uniform height and projections and recesses along the side surfaces of the core, which increases the surface areas of the core. As a result, a cooling ability of the core is improved when it is in use. Therefore, the rotating machines (such as motors) with higher efficiencies can be obtained.

The invention claimed is:
1. A laminated stator core using a side of a magnetic strip as a side of a core sheet,
   wherein a plurality of the core sheets have an identical shape, each of the core sheets having a rotor space and four corners rounded off in a circular arc shape, the rotor space formed in an inner part of the core sheets, a center of the rotor space arranged eccentrically in lateral and vertical directions to a center of the core sheet, the four corners formed at the same radius distance from the center of the rotor space, and the core sheets are rotated by 180 degrees and laminated in a manner that the centers of the rotor spaces are vertically aligned.

2. The laminated stator core as defined in claim 1, wherein the core sheet has a vertical width of $(a+\beta/2-\alpha/2)$ and a lateral width of "b," and a distance from the center of the rotor space formed in the inner part of the core sheet to a top side of the core sheet is $(a+\beta)/2$, to a bottom side is $(a-\alpha)/2$, to a left-hand side is $(b-\gamma)/2$, and to a right-hand side is $(b+\gamma)/2$, In this claim, $\alpha$, $\beta$, and $\gamma$ are set within the following ranges: $0<\alpha<0.05a$; $0<\beta<0.05a$; and $0<\gamma<0.05b$.

3. The laminated stator core as defined in claim 1, wherein every core sheet or every set of the plural core sheets is rotated by the predetermined angle and laminated.

4. The laminated stator core as defined in claim 1, wherein the core sheets are sequentially interlocked through caulking portions.

5. A method for manufacturing a laminated stator core using a lateral side of a magnetic strip as a side of a core sheet, the core sheet having a rectangular shape with a vertical width of $(a+\beta/2-\alpha/2)$ and a lateral width of "b," the core sheet having a round shaped rotor space in an inner part thereof, and the method comprising the steps of:

Step 1 of forming the rotor spaces, the rotor spaces adjacent in a feed direction of the strip having a distance of "b" between the centers thereof, the rotor spaces in the core sheets at the end in the width direction of the strip having the centers located $(a-\alpha)/2$ inward from the side edge of the core sheets;

Step 2 of punching out slots in the strip having the rotor spaces, the slots formed with respect to the center of the rotor space, thereby forming magnetic pole pieces in the inner part of the core sheet and locating portions at the corners of the core sheet axisymmetrically with respect to the center of the rotor space; and Step 3 of punching out the core sheet using a set of a punch and a die in a manner that axes of the punch and the die are aligned with the center of rotor space, each of the punch and the die having a vertical width of $(a+\beta)$ and a lateral width of $(b+\gamma)$; pressing the core sheet into the die; and laminating the core sheet inside the die with a position thereof adjusted using positioning walls fitting to the locating portions of the core sheet;

wherein the die rotates every core sheet or every set of the plural core sheets by a predetermined angle prior to the lamination of the core sheets, In this claim, values of $\alpha$, $\beta$, and $\gamma$ finalize dimensions of projections and recesses formed along the sides of the laminated stator core.

6. The method as defined in claim 5, wherein the strip has three or more lines of the core sheets, the core sheets aligned in the width direction of the strip are lined up in the same manner to the feed direction of the strip, and each of the core sheets in an inner line between the core sheets at the both ends of the strip has the center of the rotor space arranged eccentrically in one direction to the center between the lateral sides of the core sheet.

7. The method as defined in claim 6, wherein the core sheets in the inner line are punched out after the core sheets at the both ends are punched out.

8. The method as defined in claim 7, wherein the core sheets are lined up in a plurality of inner lines and aligned in the same manner to the feed direction of the strip, and the core sheets are punched out sequentially.

9. The method as defined in claim 6, wherein the core sheets in the inner line/lines are punched out, rotated, and laminated in the same way as the core sheets at the both ends.

* * * * *